April 25, 1950 B. V. K. FRENCH 2,505,178

SLIDE WIRE PERMEABILITY UNIT

Filed Feb. 26, 1946

INVENTOR

Benedict V. K. French

BY

Nicholas Lange

ATTORNEY

Patented Apr. 25, 1950

2,505,178

UNITED STATES PATENT OFFICE 2,505,178

SLIDE WIRE PERMEABILITY UNIT

Benedict V. K. French, Larchmont, N. Y., assignor to P. R. Mallory & Co., Inc., Indianapolis, Ind., a corporation of Delaware Application February 26, 1946, Serial No. 650,364

9 Claims. (Cl. 171—242)

This invention relates to variable inductance tuners and particularly to variable inductance tuners comprising a magnetic core structure.

An object of the invention is to improve the construction and operation of inductance tuners.

Another object of the invention is to obtain a substantially uniform frequency variation throughout the whole frequency range of a variable inductance tuner.

A further object is to utilize a magnetic core for improving the frequency response at the low frequency portion of the tuning range and to remove the effect of the iron core when the tuner is operated at higher frequencies.

An additional object of the invention is to provide an inductance tuner which may be used over a wide tuning range.

Other objects of the invention will be apparent from the following description and the accompanying drawings taken in connection with the appended claims.

While preferred embodiments of the invention are described herein, it is contemplated that considerable variation may be made in the method of procedure and the construction of parts without departing from the spirit of the invention. In the following description, and in the claims, parts will be identified by specific names, for convenience, but they are intended to be as generic in their application to similar parts as the art will permit.

Figure 1:
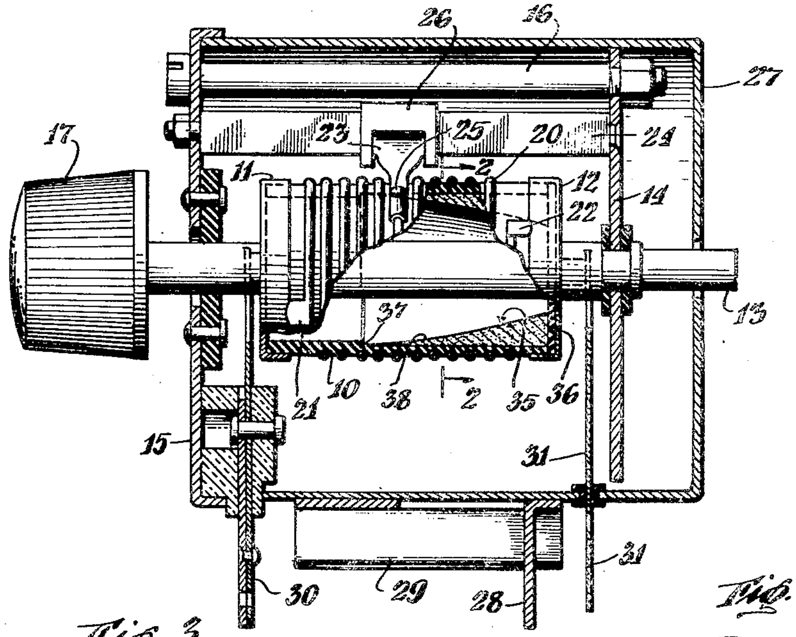
Figure 1 is a vertical sectional view, partially in elevation, of an inductive tuner constructed in accordance with the invention.
Figure 2:
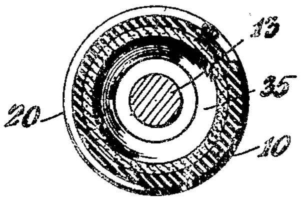
Figure 2 is a sectional view taken along the line 2—2 of Figure 1.

This invention is particularly applicable where it is desirable to obtain a small compact inductance tuning arrangement which has a uniform frequency response over the entire tuning range thereof.

One type of variable inductance tuner heretofore used comprises a number of coil turns wound upon a rotatable non-magnetic core, the tuned frequency being changed by a sliding contactor which moves along the coil as the core is rotated. Although this type of tuner affords many important advantages over conventional variable condenser tuning circuits, it has been found that frequency variation per turn is considerably greater at the high frequency portion of the tuning range than at the low frequency portion. According to the present invention, this disadvantage is overcome, to a large extent, by utilizing a tapered magnetic core, preferably formed from pressed powdered iron, for increasing the frequency variation per turn at the low frequency portion of the tuning range. By properly selecting the core taper, a substantially uniform frequency variation per turn may be obtained throughout the whole tuning range. When my novel core construction is used in tuners having conventional frequency ranges, I prefer to utilize a magnetic core for improving the frequency response at the low frequency portion of the tuning range, the effect of the core being eliminated at higher frequencies in order to avoid the relatively large hysteresis and eddy current losses which might be encountered at such higher frequencies.

An advantage of my novel core construction resides in the fact that the physical size of the tuner required for a selected frequency range may be reduced since the portions of the coil adjacent the magnetic core respond to a wider range of frequencies than would be covered if a non-magnetic core were utilized. Consequently, a more compact tuning unit may be obtained which is advantageous in manufacturing small radio receivers and transmitters. It will be apparent that the residual inductance of the tuner and the leads associated therewith is decreased as a result of reducing the size of the tuner. Inasmuch as the high frequency limit of the tuner is determined by the capacity of the fixed condenser used in the inductive tuning circuit together with the residual inductance of the tuner, it will be apparent that this high frequency limit will be increased as the residual inductance of the tuner is decreased. As a result, the tuning range for a given size of inductance coil is considerably increased.

The degree to which the iron core is effective in improving the frequency characteristics of the tuner is dependent somewhat upon the spacing or coupling between the coil and the magnetic core. Where very close coupling is desired, the low frequency portion of the coil may be wound directly upon the magnetic core with a suitable insulating varnish or other suitable material interposed between the coil and the magnetic core while the high frequency portion may be wound upon a tubular extension of the magnetic core which may be formed of a suitable insulating material The core may be tapered, if desired, by providing a suitable recess therein so as to obtain a substantially uniform frequency variation per turn.

Referring now to the drawings in detail, a cylindrical shell or coil form 10, which is preferably formed from insulating material such as a synthetic resin, resin-impregnated fibre or ceramic material, is provided with end caps 11, 12 which are attached, in any suitable manner, to a control shaft 13. This shaft is suitably journaled in a pair of end plates 14, 15 which are separated by a plurality of spacers, one of which is shown at 16. A knob 17 may be provided for adjusting the control shaft 13 in the manner hereinafter described. A helical coil 20 is wound upon the coil form 10 which may be suitably grooved, if desired, to maintain a uniform spacing between adjacent turns of the coil. The opposite ends of the coil 20 are attached by upturned lugs 21, 22 to the respective end caps 11, 12. A metal contactor 23 is slidable longitudinally in a suitable groove, not shown, formed in a trolley rod 24 which is supported between end plates 14, 15 in any suitable manner. The contactor 23 is provided with a plurality of grooved contact nibs, one of which is shown at 25. The contact nibs 24 slide along the turns of the coil 20 as it is rotated by the knob 17 thus causing the contactor 23 to move longitudinally along the trolley rod 24 to thereby afford a variable inductance tuning connection to the coil. The contactor nibs 25 may be prevented from sliding off the ends of the coil by a stop member 26 which is adapted to engage one of the upturned lugs 21, 22 and prevent further rotation of the coil when the contactor 23 reaches one of its extreme end positions.

The tuner may be enclosed by a shield can 27 which is in contact with a lug 28 formed on a suitable flanged mounting base 29. The lug or terminal 28 affords a connection to the contractor 23 through shield can 27, end plates 14, 15 and trolley rod 24. Contact may be made with one end of the coil through a suitable brush engaging the cap 11, said brush being mounted on a contact arm 30 which is supported by and insulated from the shield 27 in any suitable manner. In similar fashion, contact may be made with the other end of the coil by a contact strip 31 which engages the cap 12 through a suitable brush, said contact strip being supported by and insulated from the shield 27 in any suitable manner.

Figure 3:
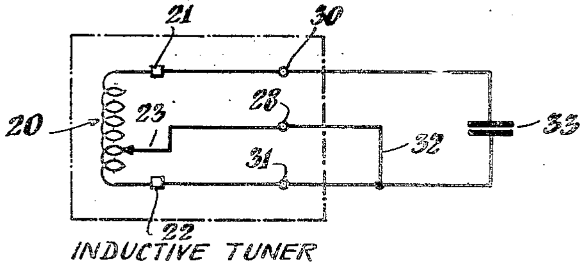
Figure 3 is a schematic circuit diagram showing a tuning circuit.
Figure 5:
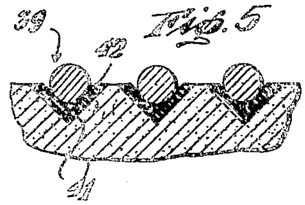
Figure 5 is an enlarged sectional view of a portion of the core structure shown in Figure 4.

In the ordinary inductive tuning circuit as shown in Figure 3, the contacts 28, 31 are connected together, either by a conductor as at 32 or by a mechanical connection in the tuner, and a condenser 33 is connected across terminals 30, 31. Accordingly, when the contactor 23 is moved to a position adjacent the lug 22, the whole of the coil 20 is in circuit and, consequently, the circuit is tuned to a low frequency. As contactor 23 moves to a position adjacent lug 21, less of the coil will be included in the circuit and the tuned frequency will increase. Accordingly, the portion of the coil adjacent lug 22 will hereinafter be referred to as the low frequency end of the coil while the portion of the coil adjacent lug 21 will hereinafter be referred to as the high frequency portion of the coil.

According to the invention, a magnetic core 35, Figure 1, is provided which extends from the low frequency end of the coil to an intermediate portion of the coil. The core is preferably formed from pressed powdered iron and the outer surface of the core is adapted to engage the inner surface of the coil form 10. As shown best in Figure 1, one end of the core 35 bears against an insulating plate 36 which, in turn, is secured to the end cap 12 while the other end of the core is seated against a flanged portion 37 formed on the inner surface of the coil form 10. It will be apparent that the magnetic core is closely spaced or coupled to the adjacent turns of the coil 20. The inner surface of the core is tapered as at 38 so that the amount of magnetic material in the core increases progressively as the low frequency end of the coil is approached with the result that the inductance variation per turn is progressively increased by the iron core as the contactor 23 moves toward the low frequency end of the coil.

It is an important feature of the invention that the core 35 does not extend to the high frequency portion of the coil. Consequently, as the contactor 23 is moved toward lug 21 to tune the coil to higher frequencies, the low frequency portion of the coil is short circuited as indicated in Figure 3, thus eliminating the effect of the magnetic core upon the coil windings at higher frequencies. This is desirable as the hysteresis and eddy current losses resulting from the use of a magnetic core are greater at higher frequencies. The novel core construction of this invention affords the advantages of a high permeability magnetic core at the low frequencies while the increased losses resulting from the use of a magnetic core at higher frequencies are eliminated.

The increased inductance resulting from the use of the magnetic core enables the physical size of the coil to be reduced to a large extent since the portions of the coil adjacent the core respond to a wider range of frequency than would be covered if a non-magnetic core were utilized. Therefore, the tuning range which may be obtained for a given size of coil is considerably increased by utilizing the novel magnetic core construction. Moreover, the reduction in physical size of the coil decreases the residual inductance of the coil and associated leads with the result that higher frequencies may be reached with a given size of tuning circuit condenser.

Figure 4:
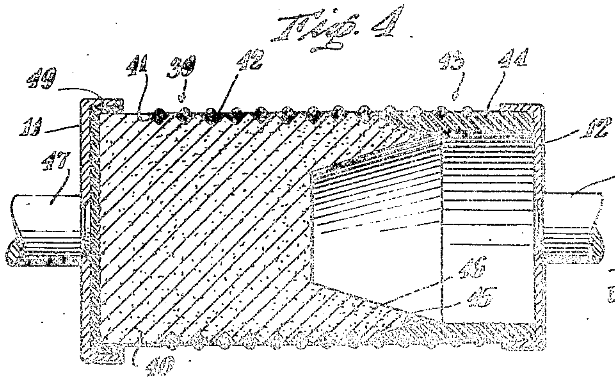
Figure 4 is a vertical sectional view of a modified core construction.

In the modification of the invention shown in Figure 4, the low frequency portion 39 of the coil is wound directly upon a cylindrical core 40 of pressed powdered magnetic material. The core should preferably be provided with a helical groove 41 in which the coil is wound and a suitable layer of insulating varnish may be applied as at 42 to insulate the coil from the metallic core structure. With certain types of cores, the resistance of the core material is sufficiently high to render the use of the insulating varnish unnecessary. The high frequency portion 43 of the coil is wound upon a tapered cylindrical shell or form 44 of suitable insulating material which is supported upon a complementary arcuately formed shoulder 45 provided at the high frequency end of the core 40. In order that the effect of the magnetic core shall progressively diminish as higher frequencies are approached, the high frequency end of the core is recessed as at 46 so that the amount of magnetic material in the core decreases progressively as the high frequency end is approached. End caps 11 and 12 may be provided to support the coil structure in the same manner as shown in Figure 1 although the shaft 13 should be replaced by a pair of stub shafts 47, 48 which are secured respectively to the caps 11, 12. A sheet of insulating material 49 may be provided to insulate the cap 11 from the core 40. The modified core construction shown in Figure 4 is interchangeable with the core construction shown in Figure 1 except for the fact that the contacts 28 and 30 should be interconnected when the modified core is used instead of contacts 28 and 31 in order to obtain the proper polarity of the coil in the tuning circuit. This modified construction has the additional advantage that the coupling between the coil and the magnetic core is quite close so that the core is extremely effective in improving the frequency characteristics of the tuner.

While the present invention, as to its objects and advantages, has been described herein as carried out in specific embodiments thereof, it is not desired to be limited thereby but it is intended to cover the invention broadly within the spirit and scope of the appended claims.

What is claimed as new and desired to be secured by Letters Patent is:

1. A coil structure for an inductive tuner comprising a cylindrical shell formed from insulating material, a helical inductive tuning coil mounted on the outer surface of said shell, and a tapered, paramagnetic core member mounted within said shell, means for securing said core member to said shell, said core member extending from one end of the coil to an intermediate portion of the coil, the amount of paramagnetic material in the core increasing progressively as said end of the coil is approached.

2. A coil structure for an inductive tuner comprising a cylindrical shell formed from insulating material, a helical inductive tuning coil mounted on the outer surface of said shell, a core member formed from pressed powdered iron, the outer surface of said core member engaging the inner surface of said shell, said core member extending from an intermediate portion of the coil to one end of the coil and progressively increasing in thickness as said end of the coil is approached, and means for securing said core member to said shell.

3. A coil structure for an inductive tuner comprising supporting means, an inductive tuning coil mounted on said supporting means, a tapered core member of paramagnetic material closely spaced with respect to said coil and extending from one end of the coil to an intermediate portion thereof, and means for securing said core member to said supporting means.

4. In an inductive tuner, the combination which comprises a rotatable core structure including a paramagnetic portion and a non-magnetic portion, a bare wire helically wound around said core portions constituting an inductive tuning coil, one section of said coil being coupled to the paramagnetic portion of said core and the remainder of said coil being substantially decoupled from said paramagnetic portion of the core, and a contactor mounted for sliding longitudinal displacement in the direction of the axis of said coil and in sliding engagement with the bare wire of the coil whereby upon rotation of said core said contactor will travel along the length of the helically wound wire thereon and will vary the inductance between the said contactor and one end of the coil.

5. In an inductive tuner, a rotatable core structure including a low frequency portion, a bare wire helically wound around said core structure constituting an inductive tuning coil, a metallic contactor mounted for sliding longitudinal displacement in the direction of the axis of said coil and in continuous sliding engagement with the bare wire of said coil, and means for rotating said coil whereby upon rotation of said core said contactor will travel along the length of the helically wound wire thereon and will vary the inductance between the said contactor and one end of the coil, said core structure comprising a tapered core member of paramagnetic material mounted adjacent the low frequency portion of said coil in at least a longitudinally fixed position relative thereto to thereby increase the inductance variation per core revolution at the low frequency part of the tuning range.

6. In an inductive tuner, a rotatable core structure including a low frequency portion, a bare wire helically wound around said core structure constituting an inductive tuning coil, a metallic contactor mounted for sliding longitudinal displacement in the direction of the axis of said coil and in sliding engagement with the bare wire of said coil, and means for rotating said coil to cause said contactor to travel along the coil during rotation of said core to thereby vary the inductance of a tuning circuit, said core structure comprising a tapered core member of paramagnetic material closely spaced with respect to the coil and extending from the low frequency portion of the coil to an intermediate portion thereof whereby the inductance variation per core revolution is substantially uniform throughout the tuning range and the effect of the iron core is eliminated when the tuner is operated at the high frequency portion of the tuning range.

7. A slide wire variable inductance device for tuning a radio frequency circuit comprising a bare conductor formed into a coil, a contactor assembly, a trolley rod mounted in parallel spaced position with respect to the side of said coil, said contactor assembly being adapted for longitudinal slidable movement along said rod, means for rotating said coil, the rotation of said coil causing said contactor assembly to move along the conductor of said coil thereby varying the amount of said coil in the circuit being tuned, and a tapered magnetic core of pressed powdered material coupled to a portion of said coil and rotatable therewith.

8. A slide wire variable inductance device for tuning a radio frequency circuit comprising a bare conductor formed into a coil, a contactor assembly, a trolley rod mounted in parallel spaced position with respect to the side of said coil, said contactor assembly being adapted for longitudinal slidable movement along said trolley rod, means for rotating said coil and thereby to cause said contactor assembly to be moved along said trolley rod and the conductor of said coil whereby the amount of said coil in the circuit being tuned is varied, and a tapered magnetic core of pressed powdered material coupled to a portion of said coil and rotatable therewith, said core extending from one end of said coil to an intermediate portion thereof to thereby increase the inductance variation per core revolution at the low frequency part of the tuning range.

9. A variable inductance device comprising a coil form of insulating material, an inductive coil having a plurality of turns wound thereon, a contactor carriage, a trolley rod mounted in parallel spaced position with respect to the side of said coil, a tapered core structure of pressed powdered material coupled to said coil, the outer surface of said core engaging the inner surface of said coil form and being longitudinally immovable relative thereto, said contactor carriage being adapted for longitudinal slidable movement along said trolley rod, and means for rotating said coil and thereby to cause said contactor carriage to be moved along the turns of said coil whereby the amount of said coil in the circuit being tuned is varied.

BENEDICT V. K. FRENCH.

REFERENCES CITED

The following references are of record in the file of this patent:

UNITED STATES PATENTS

| Number | Name | Date |
|---|---|---|
| 822,332 | Wood | June 5, 1906 |
| 2,005,203 | Polydoroff | June 18, 1935 |
| 2,141,890 | Weis | Dec. 27, 1938 |
| 2,163,448 | Otto | June 20, 1939 |
| 2,175,554 | Bliss | Oct. 10, 1939 |
| 2,222,387 | Wheeler et al. | Nov. 19, 1940 |
| 2,385,578 | Kaschke | Sept. 25, 1945 |
| 2,399,060 | Puerner | Apr. 23, 1946 |